US009928374B2

(12) United States Patent
Anantharaman

(10) Patent No.: US 9,928,374 B2
(45) Date of Patent: Mar. 27, 2018

(54) DIGITAL RIGHTS MANAGEMENT USING GEOGRAPHIC AND TEMPORAL TRAITS

(71) Applicant: Adobe Systems Incorporated, San Jose, CA (US)

(72) Inventor: Arun Anantharaman, Lost Altos Hills, CA (US)

(73) Assignee: Adobe Systems Incorporated, San Jose, CA (US)

(*) Notice: Subject to any disclaimer, the term of this patent is extended or adjusted under 35 U.S.C. 154(b) by 125 days.

(21) Appl. No.: 14/975,442

(22) Filed: Dec. 18, 2015

(65) Prior Publication Data

US 2017/0177886 A1 Jun. 22, 2017

(51) Int. Cl.
*G06F 21/62* (2013.01)
*G06Q 30/00* (2012.01)

(52) U.S. Cl.
CPC ..... *G06F 21/6209* (2013.01); *G06Q 30/0185* (2013.01)

(58) Field of Classification Search
CPC .................. G06F 21/6209; G06C 30/0185
See application file for complete search history.

(56) References Cited

U.S. PATENT DOCUMENTS

| | | | | |
|---|---|---|---|---|
| 7,013,149 B2* | 3/2006 | Vetro | ..................... | H04L 29/06 370/328 |
| 2005/0044016 A1 | 2/2005 | Irwin et al. | | |
| 2005/0066357 A1 | 3/2005 | Ryal | | |
| 2005/0273514 A1 | 12/2005 | Milkey et al. | | |
| 2006/0041502 A1 | 2/2006 | Blair et al. | | |
| 2006/0149727 A1 | 7/2006 | Viitaharju | | |
| 2008/0060084 A1 | 3/2008 | Gappa et al. | | |
| 2008/0104118 A1 | 5/2008 | Pulfer et al. | | |
| 2008/0182592 A1* | 7/2008 | Cha | ..................... | H04L 63/04 455/456.3 |
| 2009/0007227 A1* | 1/2009 | Burgess | ................ | G06F 21/316 726/1 |
| 2009/0048908 A1 | 2/2009 | Kaplan et al. | | |

(Continued)

OTHER PUBLICATIONS

Surminen et al. (Location-based DRM using WiFi Access Points, 5 pages, 2007 IEEE).*

(Continued)

*Primary Examiner* — Oleg Korsak
(74) *Attorney, Agent, or Firm* — Wolfe-SBMC

(57) ABSTRACT

Digital rights management using geographic and temporal traits is described. In one or more implementations, a digital medium environment is configured to control access to at least on item of content by digital rights management functionality embedded as part of the content. Data is collected describing geographical traits of a location or temporal traits associated with a request received from the user to access the content. A determination is made from the data using a digital rights management module embedded as part of the content as to whether the geographical or temporal traits meet specified traits of a geographical behavior of a digital rights management policy enforced by the digital rights management module for the at least one item of the content. Responsive to a determination that the specified traits are met, access is permitted to the least one item of the content by the embedded digital rights management module.

20 Claims, 9 Drawing Sheets

(56) References Cited

U.S. PATENT DOCUMENTS

| | | |
|---|---|---|
| 2011/0235799 A1 | 9/2011 | Sovio et al. |
| 2012/0216300 A1* | 8/2012 | Vivolo .................... G06F 21/10 |
| | | 726/30 |
| 2012/0303827 A1* | 11/2012 | Neystadt ............... H04L 63/107 |
| | | 709/229 |
| 2013/0052990 A1* | 2/2013 | Zhang .................... H04L 63/20 |
| | | 455/411 |
| 2013/0254699 A1* | 9/2013 | Bashir ................... G06F 3/0481 |
| | | 715/772 |
| 2013/0315392 A1* | 11/2013 | Steinhauser ........ G06F 21/6209 |
| | | 380/258 |
| 2015/0058347 A1 | 2/2015 | Russek |
| 2015/0234796 A1 | 8/2015 | Williams et al. |
| 2015/0281299 A1 | 10/2015 | Moustafa et al. |
| 2015/0324698 A1 | 11/2015 | Karaoguz et al. |
| 2017/0032109 A1 | 2/2017 | Anantharaman |
| 2017/0163839 A1 | 6/2017 | Arana et al. |
| 2017/0262619 A1 | 9/2017 | Taneja et al. |
| 2017/0277868 A1 | 9/2017 | Anantharaman |
| 2017/0278205 A1 | 9/2017 | Anantharaman |
| 2017/0278206 A1 | 9/2017 | Anantharaman |
| 2017/0286642 A1 | 10/2017 | Anantharaman |

OTHER PUBLICATIONS

"Pre-Interview Communication", U.S. Appl. No. 14/812,825, dated Oct. 21, 2016, 3 pages.

"First Action Interview Office Action", U.S. Appl. No. 14/812,825, dated Mar. 24, 2017, 3 pages.

"Final Office Action", U.S. Appl. No. 14/812,825, Sep. 7, 2017, 9 pages.

"First Action Interview Pre-Interview Communication", U.S. Appl. No. 15/063,996, Oct. 16, 2017, 3 pages.

"Non-Final Office Action", U.S. Appl. No. 15/080,062, Nov. 3, 2017, 16 pages.

"Non-Final Office Action", U.S. Appl. No. 15/090,211, Nov. 17, 2017, 18 pages.

"Notice of Allowance", U.S. Appl. No. 14/812,825, Dec. 18, 2017, 7 pages.

\* cited by examiner

DIGITAL RIGHTS MANAGEMENT USING GEOGRAPHIC AND TEMPORAL TRAITS

BACKGROUND

Digital rights management is used to control use of content, e.g., to alter, consume, or distribute content. Current digital rights management techniques are based on qualities that are unique to a particular user. For example, a purchaser of an application from a conventional application store, a song from an online music store, and so on may be given access to the content via a user name and password of an account associated with the user for a corresponding service. Other conventional examples include persistent online authentication, unique content identifiers (e.g., CD keys), digital watermarks, and encryption keys associated with a particular user or user's device.

Each of these conventional techniques, however, is rigid and lacks an ability to address changes in how the content is to be consumed and this limit usability of the content. Accordingly, this "all-or-nothing" approach to content access may be frustrating to consumers of the content and thus limit desired distribution of the content.

SUMMARY

Digital rights management using geographic and temporal traits is described. In one or more implementations, a digital medium environment is configured to control access to at least on item of content by digital rights management functionality embedded as part of the content. Data is collected describing geographical traits of a location or temporal traits associated with a request received from the user to access the content. A determination is made from the data using a digital rights management module embedded as part of the content as to whether the geographical or temporal traits meet specified traits of a geographical behavior of a digital rights management policy enforced by the digital rights management module for the at least one item of the content. Responsive to a determination that the specified traits are met, access is permitted to the least one item of the content by the embedded digital rights management module.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
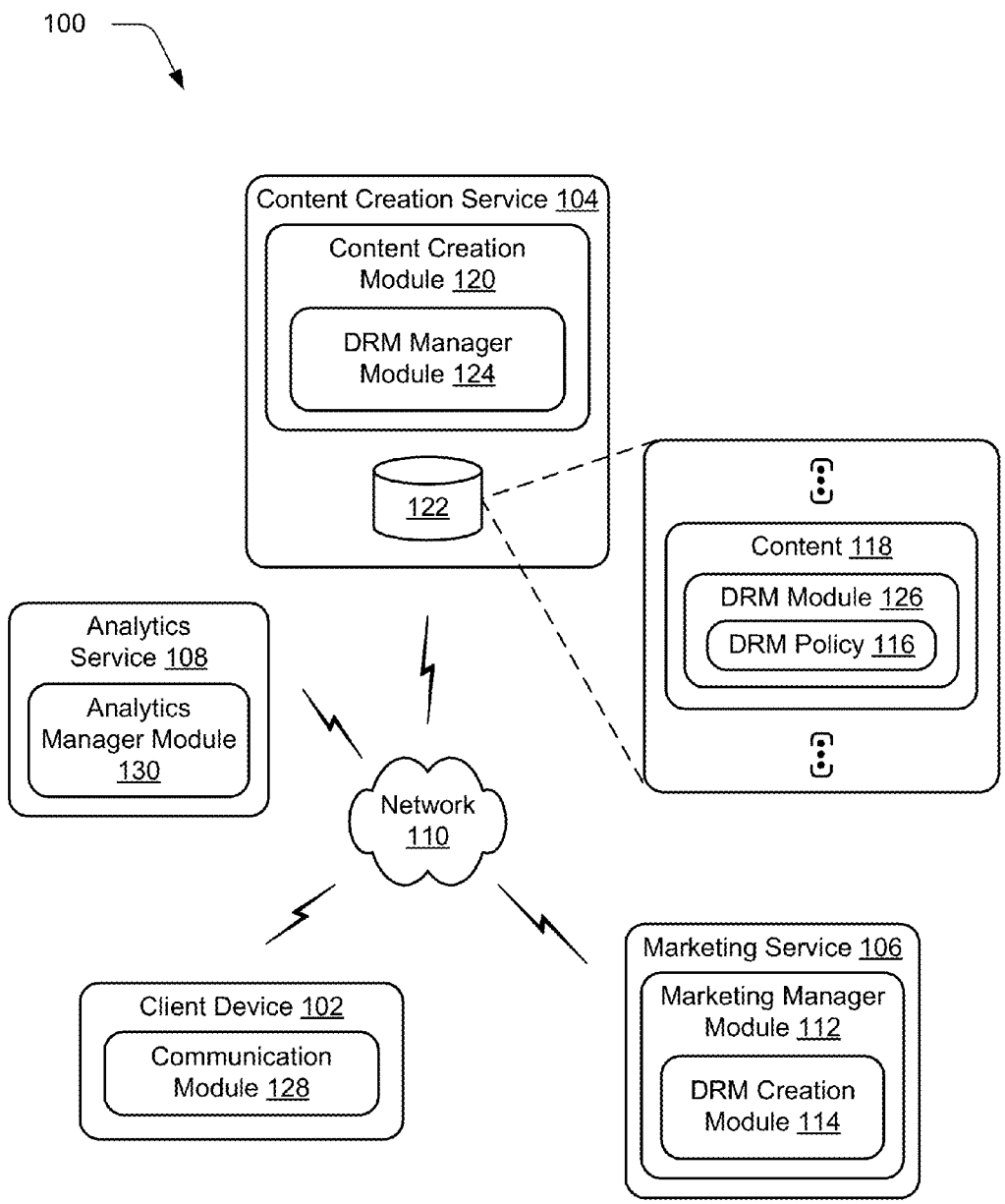
FIG. 1 is an illustration of an environment in an example implementation that is operable to employ digital rights management (DRM) and behavioral trait techniques described herein.

Conventional digital rights management techniques are rigid and inflexible and thus not able to take into account potentially changing traits of a behavior of a user that is to consume content. For example, conventional techniques typically rely on credentials that are particular to a user such that the credentials uniquely identify that user from each other user. Verification of these credentials is then used to grant access to the content in its entirety in these conventional techniques. This is because conventional credentials do not describe content consumption characteristics of the user. A user name and password, for instance, may be used to control access to content obtained from an online music store, application store, and so on. Accordingly, the user name and password do not describe behaviors of a population, such as a way in which the population acts or conducts itself toward content. As such, although these conventional techniques may relate to the particular user, these techniques do not address traits of a population behavior that may include the user and thus are not capable of addressing changing traits of the behaviors of the users.

Digital rights management techniques are described that address traits of a behavior of a user population that is to consume the content. In one or more implementations, traits of a behavior are specified that are incorporated as part of a digital rights management policy for content. Analytics data, for instance, may be collected that describes a user population as a whole. A creator of a DRM policy may then select traits of behaviors for a target population as a subset of this user population to control content consumption by the subset of the user population. As described above, behaviors describe a way in which a user population acts or conducts itself toward content that is relevant to the population as a whole but is not particular to any specific user of that population.

In this way, access to all or portions (i.e., items) of the content may be controlled by a digital rights management module based on contemplated behaviors of consumers of the content, which is embedded as part of the content. For example, a marketer may wish to include an image as part of a marketing campaign for a population segment. The marketer may then specify traits of behaviors of the specific target population (e.g., content consumption characteristics related to age, gender, geographic location included as part of analytics data) to be implemented as part of a digital rights management policy as well as characteristics of content that is to be created.

The characteristics of the content as specified by the marketer are then used by a creative professional to create the content, which is then embedded with a digital rights management module that is configured to implement the digital rights management policy. Thus, in this example a workflow may be supported in which a target population and corresponding policy is first specified through interaction with analytics data and then used as a basis to create content for deployment.

Once deployed, the digital rights management (DRM) module may implement the digital rights management policy to dynamically address traits and changes to the traits of a behavior of users that consume the content. The DRM module, for instance, is configured to control access to different portions of the content based on which traits are met by a user requesting this access. Further, the access may be conditional, such as to permit access to one portion of content if a trait is met (e.g., age 18-35) but a different portion of content if the trait is not met, e.g., that is age appropriate. In this way, the marketers may specify how content is to be consumed and address potentially changing tastes and desires of users dynamically as the user's traits change without changing the content itself. Accordingly, a single item of content may dynamically change to address changing behaviors of users that are to consume the content which was not possible in conventional techniques, which thus required updates and changes to the content which would then be populated back to the users.

For example, geographic traits may be used to control access to items of the content. This may be used to limit access to the content at work, for instance, and not permit this access at a user's home. Further, the geographic traits may leverage analytics to control access. The embedded DRM module, for instance, may implement a DRM policy to control access to reduce a likelihood that unauthorized access to the content is obtained based on where this access is to occur. This may be performed using a list of pre-calculated locations, e.g., to restrict access at a coffee shop or airport but permit access at a hotel.

This may also be performed dynamically by parsing text that describes the location. An address associated with a location, for instance, may be used as a lookup to obtain text (e.g., via a location lookup service or search engine) that describes the location, e.g., a name of a business, reviews of the business, and so on. This text may thus identify a likelihood of someone else viewing the content, e.g., to restrict access at a coffee shop or airport but permit access at a hotel as described above. In this way, the DRM module may dynamically address how the content is likely to be consumed based on geographical traits, further discussion of which is described in relation to FIGS. 3-5 in the following.

Temporal traits may also be used in a similar manner, such as to limit access to particular portions of the content to particular times. For example, the DRM module may be configured to redact items of item late at night but permit access to these items during business hours. Further, this access may also be combined with other traits of behaviors as described above, such as to combine with geographic traits such that this access is controlled based on time and location. Further discussion of these examples is included in relation to FIGS. 6 and 8 in the following.

In the description herein, content refers to a variety of different types of content, such as images, video, sound, and so on. Accordingly, characteristics of content to be created may describe a variety of visual and/or audio characteristics, such as objects to be included in an image, general look and feel of the image, types of sounds to be included in sound, locations for capture of video, and so forth. Digital rights management refers to access control techniques that are usable to control access to the content as a whole or particular portions of the content through use of a digital rights management policy, which in the following may be based on traits of a behavior. Traits of behaviors describe a way in which a user population acts or conducts itself toward content that is relevant to the population as a whole but is not particular to any specific user of that population, such as age group, gender, geographic location, profile, business status, group membership, device characteristics. Thus, traits met by a particular user are leveraged by the digital rights management policy to control access to content as a whole or particular portions of the content as further described below.

An example environment is first described that may employ the DRM techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital rights management and behavioral trait techniques described herein. The illustrated environment 100 includes a client device 102, a content creation service 104, a marketing service 106, and an analytics service 108 that are communicatively coupled, one to another, via a network 110. Each of these entities may be configured in a variety of ways using one or more computing devices.

A computing device, for instance, may be configured as a desktop computer, a laptop computer, a mobile device (e.g., assuming a handheld configuration such as a tablet or mobile phone as illustrated), and so forth to implement the client device 102. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" to implement the content creation service 104, the marketing service 106, and the analytics service 108 as further described in relation to FIG. 9.

The marketing service 106 is illustrated as including a marketing manager module 112. The marketing manager module 112 is representative of functionality to support user interaction to create a marketing campaign, track deployment of the marketing campaign, and so forth. A user, for instance, may interact with the marketing manager module 112 to specify a marketing campaign, items of content to be included in the campaign, and one or more behaviors of the campaign. The user may also interact with a DRM creation module 114 that is representative of functionality to specify traits of behaviors to form a DRM policy 116 to be utilized to manage access to content 118. The campaign, for instance, may be configured to control output of different images as a background based on age of users that access the content.

The marketing manager module 112 may employ analytics to generate analytics data (i.e., "big data") that describes a user population, such as traits of behaviors as described above. Through interaction with the marketing manager module 112, a user may then select traits of behaviors of a target population from this data that are to be met by users to consume corresponding portions of content 118. For example, the marketing manager module 112 may output a user interface via which a user may select traits of behaviors for a desired target population (e.g., age, gender, job title), such as by selecting a check box, keyword input, and so forth. In this way, the user is provided with detailed knowledge of traits of behaviors of a target population and from this knowledge select traits of behaviors to be met to consume particular portions of the content 118, rather than guessing which traits could be met by a target population as performed in conventional techniques which may be prone to error and inefficient.

Data describing the content 118 to be created and the traits specified above as part of creation of the DRM policy 116 through interaction with the DRM creation module 114 is then provided to a content creation service 104 in this example. The content creation service 104 includes a content creation module 120 that is representative of functionality to create content 118, which is illustrated as stored in storage 122. A variety of content 118 may be created, such as webpages, advertisements, media including video and/or audio content, and so forth.

Continuing with the previous example, a user interacts with the content creation module 120 to create content 118 having characteristics as specified by the marketing service 106. As part of this creation, a DRM manager module 124 is used to embed a DRM module 126 as part of the content 118. The DRM manager module 124 is representative of functionality to control implementation of the DRM policy 116 as part of the content 118 during consumption of the content 118, e.g., by a communication module 128 (e.g., browser, web-enabled application) of the client device 102.

The DRM module 126, for instance, may be configured to determine traits of a user that requests access to the content 118 and provide access to portions of the content 118, if any, that correspond to those traits. For example, the DRM policy 116 may specify different backgrounds of an advertisement for different behaviors. Accordingly, the DRM module 126 determines traits of a user requesting access and provides access to corresponding portions of the content 118, e.g., the backgrounds. In this way, the DRM policy 116 as specified by the marketing service 106 in this example serves as a basis for creation of the content 118 and management of access to portions of the content 118. Examples that support additional complications and dynamic responses of DRM control are described in the following.

The DRM module 126 may leverage data obtained from a variety of sources to determine traits associated with a user in order to control access. An example of one such source is illustrated as an analytics service 108 having an analytics manager module 130 that is representative of functionality to collect analytics data. This may include analytics data such as social network posts, webpages visited, items bought and so forth that is exposed via application programming interfaces by websites. This may also include tracking code that is embedded as part of content that exposes data describing usage of the content. Thus, the "big data" collected by the analytics service 108 from third-party sources may describe the user and content usage of the user which may then be used by the DRM module 126 to control interaction with the content 118 as further described below.

Figure 2:
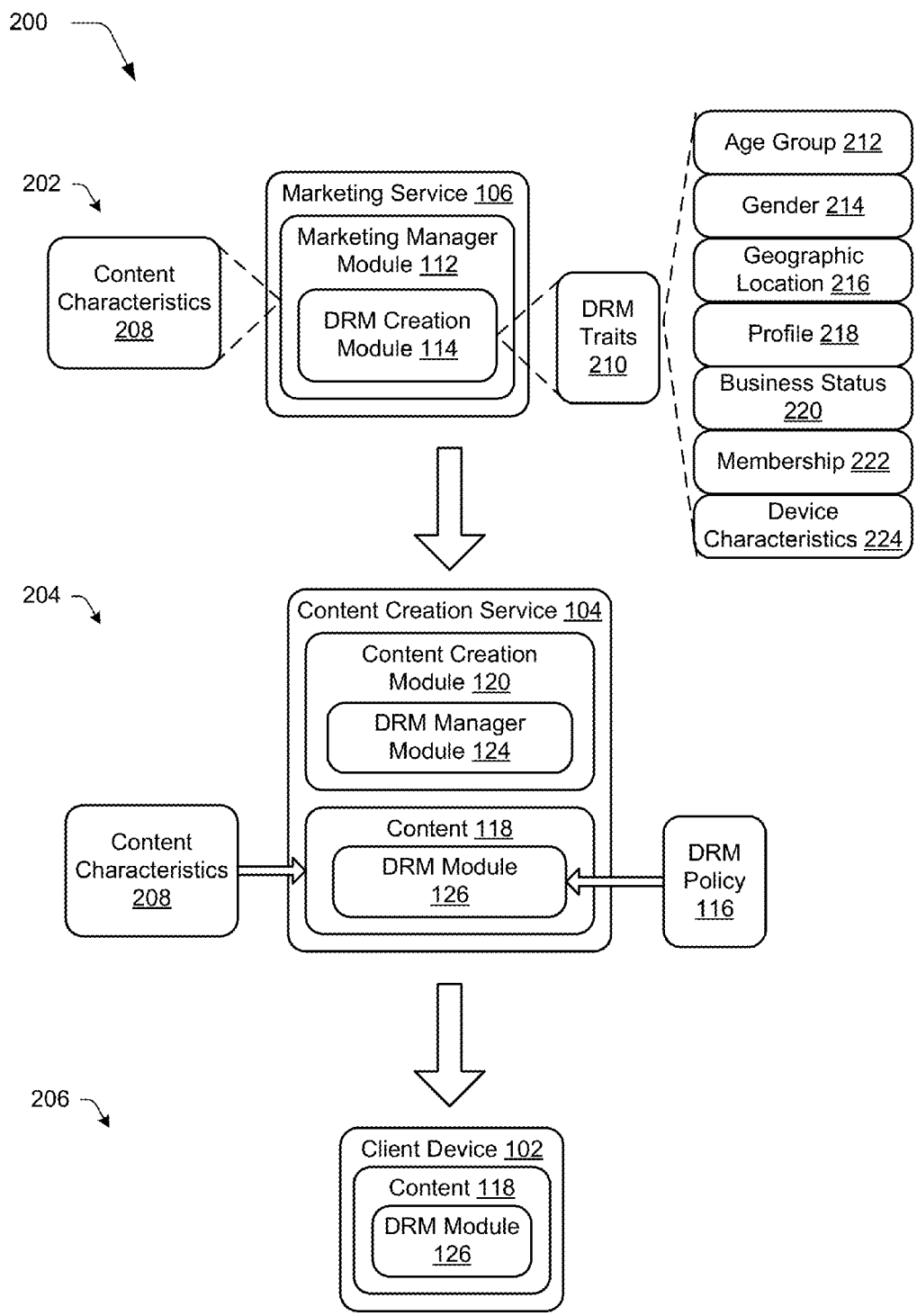
FIG. 2 depicts a system in an example implementation of creation of a DRM policy and subsequent content to be consumed by users included in a behavior.

FIG. 2 depicts a system 200 in an example implementation of creation of a DRM policy and subsequent content to be consumed by users included in a target segment. The system 200 is illustrated using first, second, and third stages 202, 204, 206. At the first stage 202, user interaction with a marketing manager module 110 is used to specify content characteristics 208, e.g., for part of a marketing campaign. A variety of different content characteristics 208 may be specified, including type of content such as webpage, printed add, audio such as a jingle or song, video such as an instructional product video or dedicated product advertisement, legal contract. The content is also deliverable in a variety of ways, e.g., streaming or downloaded for local storage and subsequent playback.

The marketing manager module 112 as previously described also includes a DRM creation module 114. The DRM creation module 114 in this instance is representative of functionality to specify digital rights management (DRM) traits 210 of behaviors that are used to create a DRM policy 116 of the content creation service 104. The DRM policy 114 as previously described is configured to control content access by determining which traits of users are satisfied in order to gain access to portions of content. As described above, the DRM traits may be specified in a variety of ways, such as through selection of particular traits collected through analytics by the marketing service 106.

A variety of different DRM traits 210 may be specified, such as traits particular to a behavior but are not unique to individual members having the behavior, e.g., may be satisfied by a plurality of users. Examples of such behavioral traits that are usable to determine potential interaction of a user with content include age group 212 (e.g., particular age or age range), gender 214, geographic location 216 (e.g., based on IP address, city, state, region, country, continent) as further described in relation to FIGS. 3-5, profile 218 (e.g., traits included in a social network profile, business title in a business website, educational degrees achieved, particular skills), business status 220 (e.g., whether an associated business is in good standing, business certifications), group membership 222 (e.g., membership to a particular organization), device characteristics 224 of a device being used by the user to gain access (e.g., brand, hardware resources, software resources, display resources), temporal traits (e.g., business hours, time of day, day of week, week of month, year) as further described in relation to FIG. 6, and so forth.

At the second stage 204, a content creation module 120 of the content creation service 104 is used to create content 118 and a DRM module 126 to control access to the content 118 as specified by a DRM policy 116 created based on the specified DRM traits 210. A creative professional, for instance, may interact with the content creation module 120 of the content creation service 104 to create content 118 as specified by the content characteristics 208 received from the marketing service 106. The marketing service 106, for instance, may specify different images and the content characteristics 208 thereof to be used as alternatives as part of a marketing campaign based on the DRM traits 210. The creative professional may then create content 118 as specified.

The content creation module 116 also includes a DRM manger module 124 that is representative of functionality that is configured to implement the DRM policy 116 through embedding the DRM module 126 as part of the content 118. The DRM module 126, for instance, may be executable to determine DRM traits associated with consumption of the content 118. As described above, these may include DRM traits 210 of a behavior that are not specific to a particular user, including traits of a device used, age group, geographic location, and so forth.

Accordingly, the content 118 having the DRM module 126 may be provided to a client device 102 for consumption as shown at the third stage 206. The DRM module 126 may then be utilized to address differences in traits between users, such as gender 212. The DRM module 126 is also usable to address changes in the user, itself, such as change in age group 212, geographic location 216, business status 220 (e.g., job title), membership 222, and so on as described above. Further, as the DRM module 126 is embedded as part of the content 118 this dynamic consumption may be performed offline without accessing a network, and thus may address limitations of conventional techniques that required access in order to serve different content, such as targeted advertisements as part of webpages that are obtained and not available locally until relevant characteristics of a user are determined, e.g., geographic location.

Figure 3:
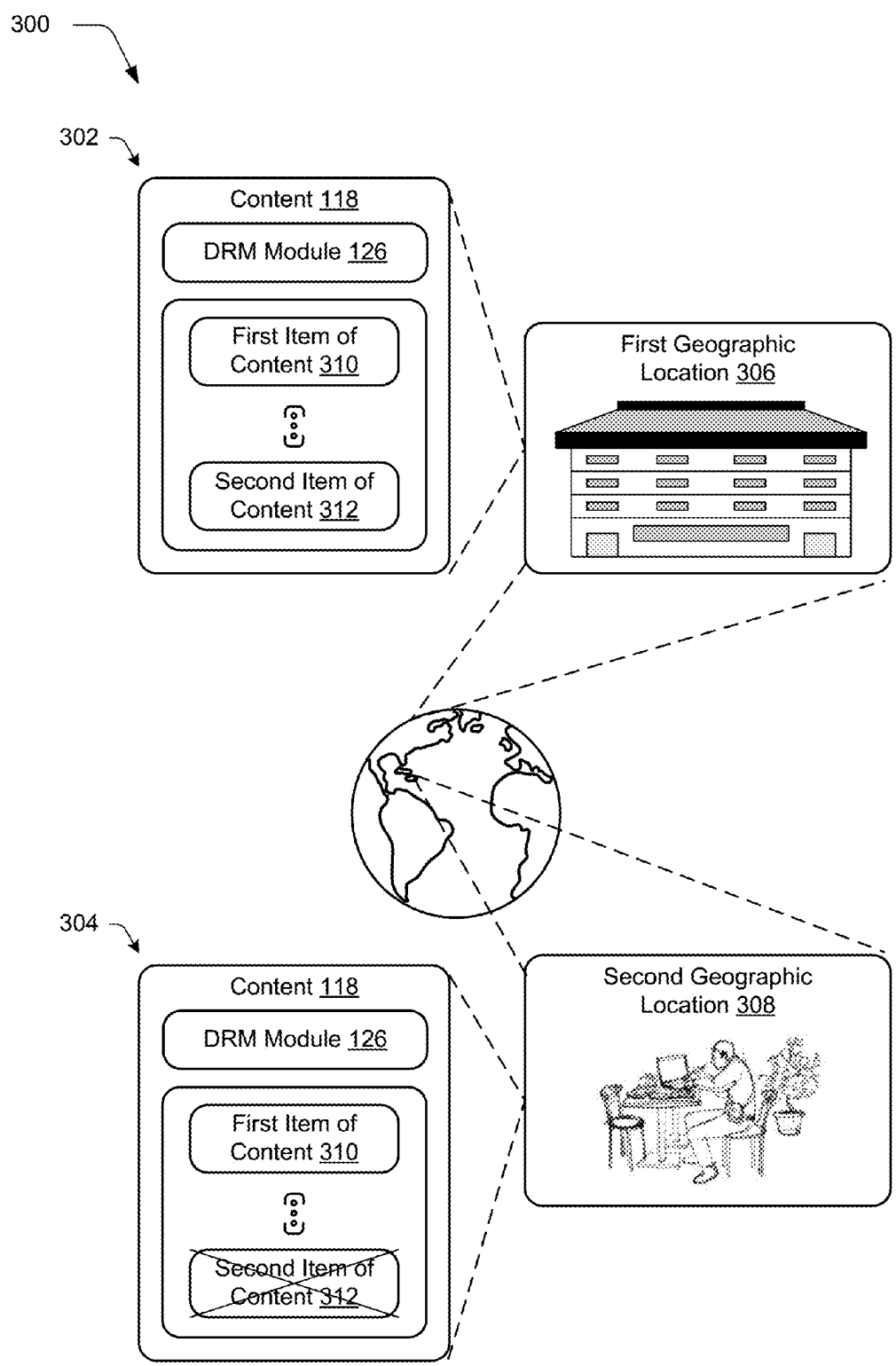
FIG. 3 depicts a system in an example implementation in which a digital rights management module is configured to control content access based on geographic traits of a behavior.

FIG. 3 depicts a system 300 in an example implementation in which the DRM module 124 is configured to control content access based on geographic traits of a behavior. This example is illustrated using first and second stages 302, 304 that correspond to first and second geographic locations 306, 308, at which, the content 118 is to be consumed. As before, the content 118 includes an embedded DRM module 126 that is configured to control access to first and second items of the content 310, 312.

In this example, the DRM module 126 is configured to use geographic traits of a behavior to control access to the first and second items of content 310, 312. For example, the DRM module 126 may determine at a first stage 302 that a location associated with a user that requests access to the content 118 corresponds to a first geographic location 306, e.g., a place of work. Accordingly, the DRM module 126 permits access to the first and second items of content 310, 312.

At the second stage 304, however, the DRM module 126 determines that a user is at a second geographic location 308 that is not the user's place of work, e.g., a coffee shop. Accordingly, in this example the DRM module 126 permits access to the first item of content 310 and restricts access to the second item of content 312. For example, the second item of content 312 may pertain to confidential information of the user's employer that is not permitted to be accessed outside the premises of the business. In this way, the second item of content 312 may be protected from access by potentially malicious third parties.

In one or more implementations, an alternative item of content is made accessible instead that otherwise would not be output if the access to the second item of content 312 was permitted, such as to include a version of the second item of content 312 that does not included information to be protected. The geographic location that is associated with the user and used a basis for this control may be determined in a variety of ways, examples of which are described in the following.

Figure 4:
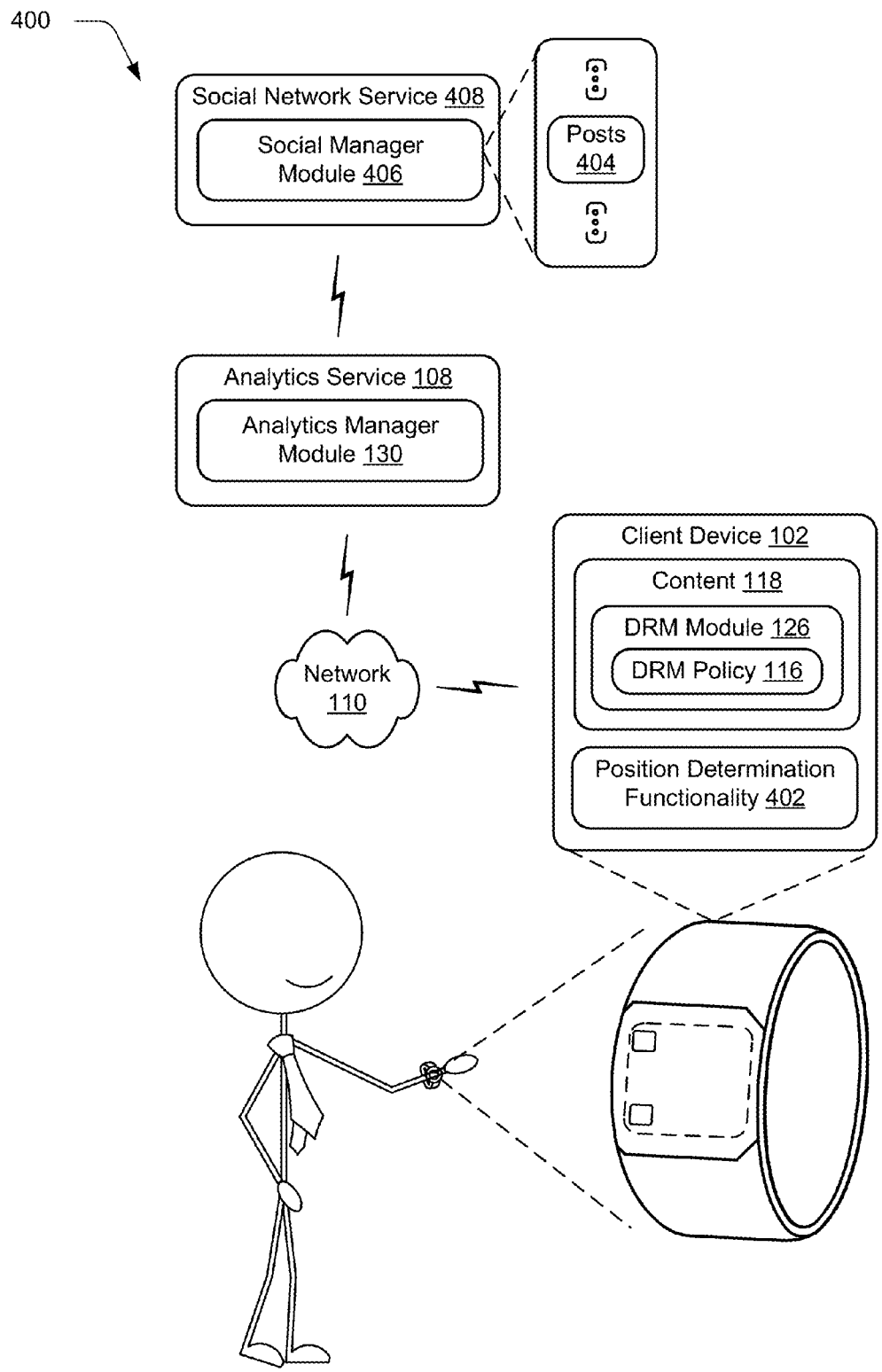
FIG. 4 depicts a system in an example implementation in which a client device of FIG. 1 is used to access content and obtain a determination of a likely position associated with the access.

FIG. 4 depicts a system 400 in an example implementation in which the client device 102 of FIG. 1 is used to access the content 118 and obtain a determination of a likely location associated with the access. In this example, the client device 102 is configured as a wearable computer, such as a smart watch. Other examples are also contemplated as further described in relation to FIGS. 1 and 9. The client device 102 includes content 118 have an embedded DRM module 126 to enforce a DRM policy 116 that is based at least in part of geographic traits of a behavior.

In this example, the client device 102 is illustrated as assuming a mobile configuration, e.g., a wearable, and a variety of other mobile configurations are also contemplated such as a heads-up display in a vehicle. The client device 102 may obtain the location in a variety of ways. In one example, position determination functionality 402 is included as part of the client device 102 itself, such as to utilize a global positioning system, triangulation through cell towers, and so forth. The position determination functionality 402, for instance, may provide coordinates that are associated with an address to abstract where the client device 102 is located, e.g., at a business, the user's home, and so forth. This abstraction may then be used as a basis for control, e.g., to identify when located at a person's work, a person's home, and so forth.

Data obtained from an analytics service 108 may also be used for this determination. An analytics service 108, for instance, may collect data from third-party sources that potentially describe a location of the user. An example of this is illustrated as posts 404 managed by a social manager module 406 of a social network service 408, such as Facebook®, Twitter®, and so forth. The posts 404, for instance, may include text entered by a user that describes the user's location, may be automatically tagged with the user's location when making the post, may include a location of the user when "checking in" at a location, and so forth.

The availability of these various ways in which to determine the location may support a variety of functionality. For example, these techniques may be utilized to verify each other, such as to verify that a likely location of a user determined using potion determination functionality 402 with a location determined from the analytics service 108. A user, for instance, may post that "I'm have a great time at the New Restaurant" to a social network service 408. Position determination functionality 402 of the client device 102 may also be used determine a location, and if these locations are consistent with each other, the DRM module 126 may provide access to the content as specified by a DRM policy 116. This may include a determination of whether a user is able to travel between a location described in a previous post to a current location in the amount of time that has passed since originating the post.

In this way, this verification serves to verify the location as well as that it is that user at that location and also likely originated the request to access the content 118, and may do so without requiring the user to enter credentials. Use of data from the analytics service 108 may also be used to support other functionality, such as to protect the content from being obtained by undesired parties, further discussion of which is included in the following.

Figure 5:
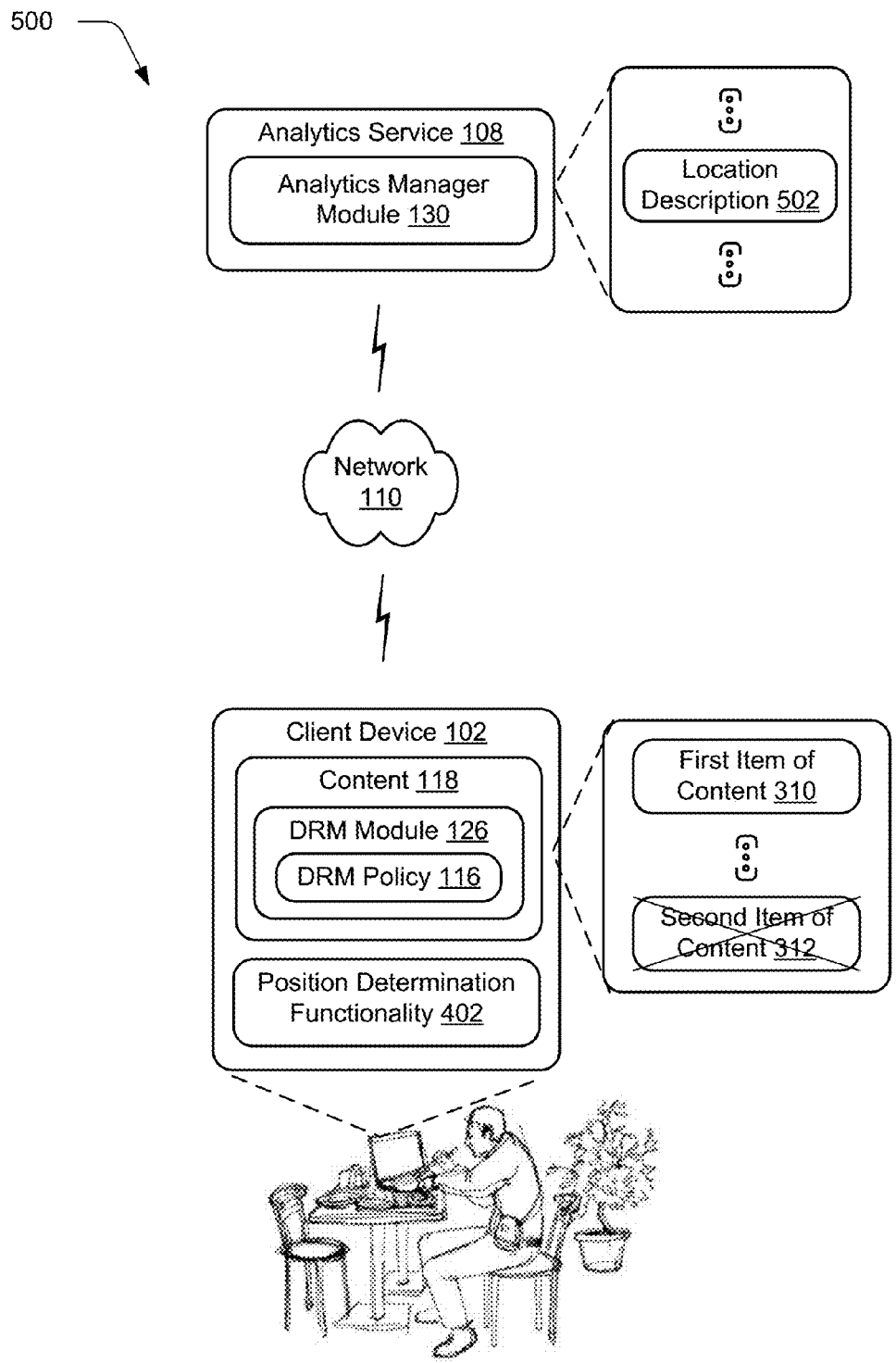
FIG. 5 depicts an example implementation in which a DRM module is configured to control access to items of the content based on a calculation of a likelihood of access to the content being compromised by a third party.

FIG. 5 depicts an example implementation 500 in which the DRM module 126 is configured to control access to items of the content based on a calculation of a likelihood that access to the content being compromised by a third party. In this example, the DRM module 126 employs logic to determine a threat level likely associated with a location at which the content 118 is to be accessed, which describes a likelihood of access to the content being compromised at the location by a potentially malicious third party.

The client device 102, for instance, may use position determination functionality 402 to determine a current location of the client device 102, e.g., using GPS coordinates. The current location of the client device 102 is then used by the DRM module 126 to obtain text describing the location. This text, for instance, may be obtained from the analytics service 108, a search engine, and so forth via a network 110 as a location description 502. For example, the client device 102 may obtain GPS coordinates, which are provided to the analytics service 108 to obtain a textual location description 502 corresponding to the coordinates, such as a text description of a name of the location (e.g., coffee shop), services provided at the location (e.g., food and beverage), and so forth.

The DRM module 126 may then parse this location description 502 to calculate a likelihood that access to the content at the location will be compromised, e.g., by a potentially malicious third party. For example, the DRM module 126 may determine from parsing the location description 502 (e.g., through natural language processing) that the location is generally considered a high traffic area, e.g., a coffee shop, airport, bus station, bar, and so forth. In response, the DRM module 126 may restrict access to the second item of content 312. In another example, the DRM module 126 may determine from parsing the location description 502 that the location is not considered to exhibit high amounts of traffic, such as at a user's home, a hotel, and so forth and thus permit access to the second item of content 312. In this way, the DRM module 126 may dynamically control access to the content in a flexible manner automatically and without user intervention based on how the content is likely to be consumed at the different geographic locations. These parsing techniques may also be used to determine which item of content is to be made accessible for other purposes, such as to provide access to entertainment options in content when located at a hotel, and so forth to dynamically tie a user's location with which items of content are to be consumed at that location.

A variety of other techniques may also be employed. For example, the DRM module 126 may employ a list of locations that have a pre-calculated likelihood of resulting in the at least one item of the content being compromised. These locations may include locations of competitor's businesses, locations at which hacking is known to occur, and so forth. This list may be maintained locally at the client device 102 to support offline access and/or accessible via the network 110. Thus, in this way the DRM module 126 may work to actively protect access to content 118 based on characteristics of where the access it to occur.

Figure 6:
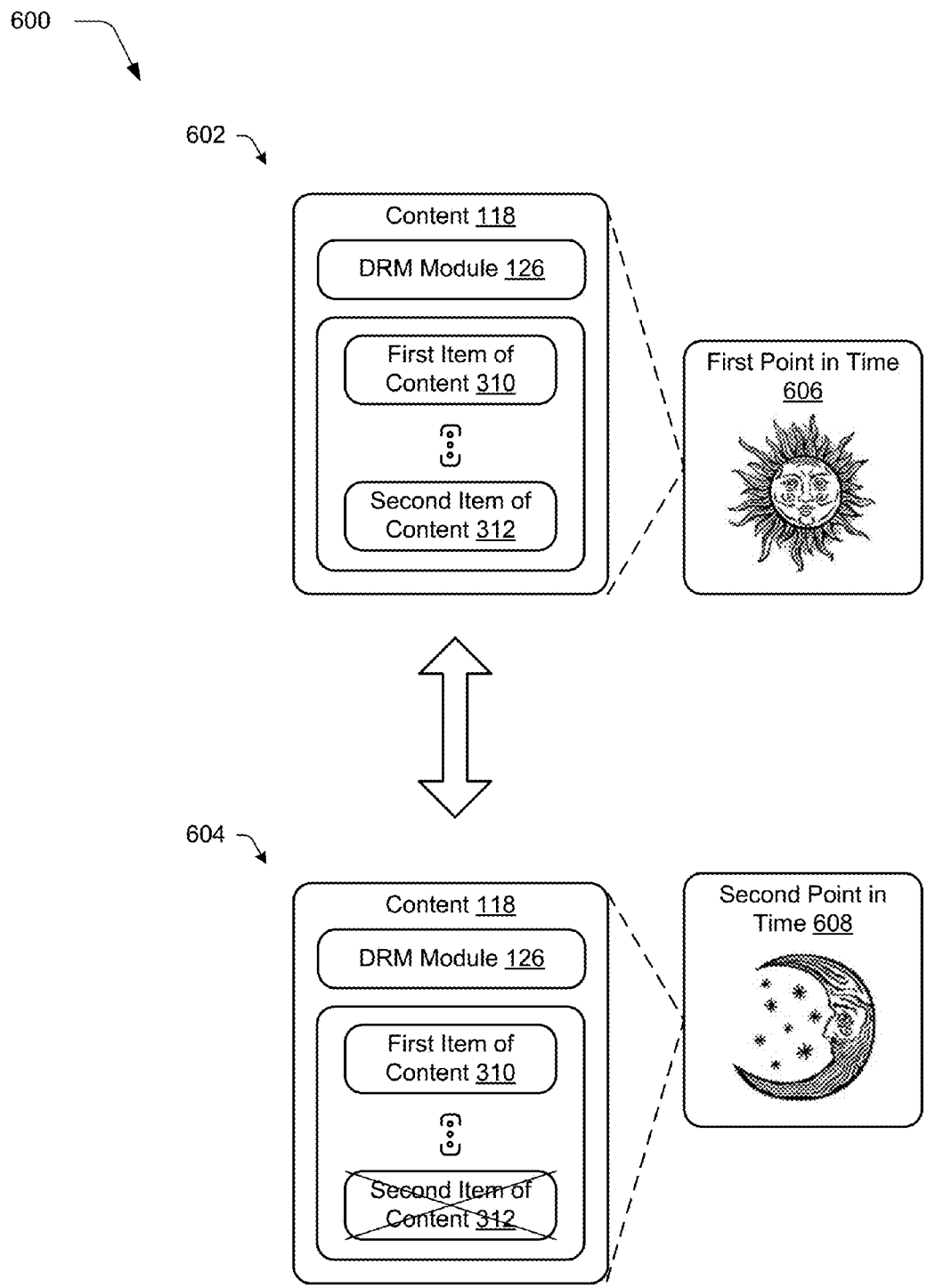
FIG. 6 depicts an example implementation in which a DRM module is configured to control access to items of the content based on temporal traits of a behavior.

FIG. 6 depicts an example implementation 600 in which a DRM module 126 is configured to control access to items of the content based on temporal traits of a behavior. This example is also illustrated using first and second stages 602, 604 that correspond to first and second points in time 606, 608, at which, the content 118 is to be consumed. As before, the content 118 includes an embedded DRM module 126 that is configured to control access to first and second items of the content 310, 312.

In this example, temporal traits are determined by the DRM module 126 to control access to the items of content 310, 312. These temporal traits include time-of-day, such as to limit access to the second item of content 312 to a first point in time 606 that includes business hours and restrict access otherwise as shown at the second point in time 608. Similar considerations may be given to a day of week, week of the month, month of the year, holidays, and so forth. In this way, the DRM module 126 may control access based on "when" in addition to "where" and "how" as described in the previous examples.

Example Procedures

The following discussion describes digital rights management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
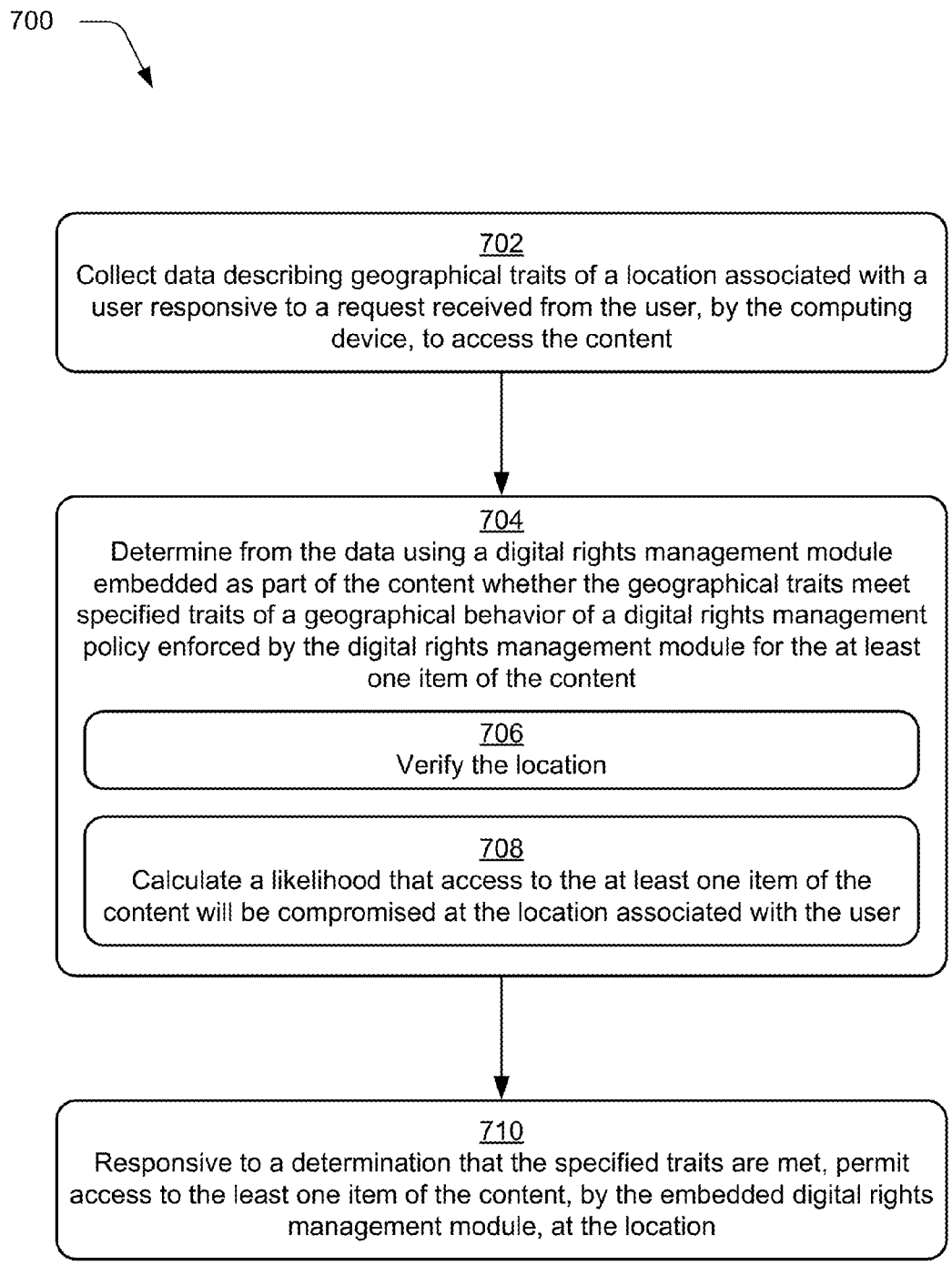
FIG. 7 is a flow diagram depicting a procedure in an example implementation in which geographic traits of a behavior are used to control access to content by a digital rights management module that is embedded as part of the content.

FIG. 7 depicts a procedure 700 in an example implementation in which geographic traits of a behavior are used to control access to content by a digital rights management module that is embedded as part of the content. Data is collected that describes geographical traits of a location associated with a request received from the user to access the content (block 702). The data, for instance, may be obtained from position determination functionality 402 (e.g., GPS) of a client device 102, parsed from text of a location description 502, and so forth.

A determination is made from the data using a digital rights management module embedded as part of the content as to whether the geographical traits meet specified traits of a geographical behavior of a digital rights management policy enforced by the digital rights management module for the at least one item of the content (block 704). The specified traits, for instance, may permit access at particular locations, restrict access at particular locations, and so forth.

This may also include verifying the location (block 706), e.g., using a plurality of different types of ways to determine a location associated with the request. This may also include calculating a likelihood that access to the at least one item of the content will be compromised at the location (block 708), e.g., whether at a coffee shop or hotel room as described above. Thus, these geographic traits of the behavior may also pertain to how the content is expected to be consumed at the location based on characteristics of the location.

Responsive to a determination that the specified traits are met, access to the least one item of the content is permitted by the embedded digital rights management module at the location (block 710). In this way, the DRM module 126 may dynamically address changes in geographic traits of a behavior associated with a user and how the user is to consume content. Other types of traits are also contemplated, an example of which is described in the following.

Figure 8:
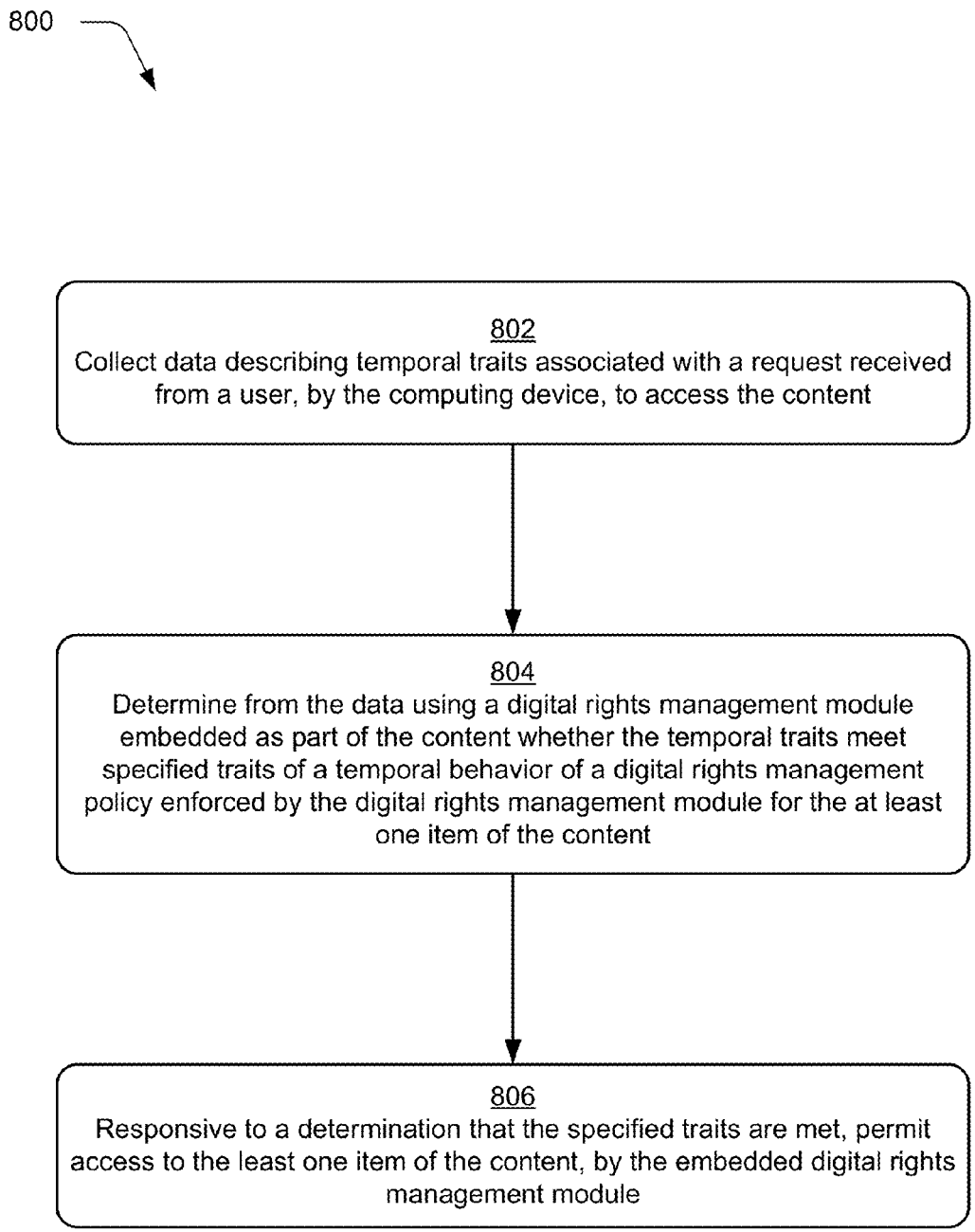
FIG. 8 is a flow diagram depicting a procedure in an example implementation in which temporal traits of a behavior are used to control access to content by a digital rights management module that is embedded as part of the content.

FIG. 8 depicts a procedure 800 in an example implementation in which temporal traits of a behavior are used to control access to content by a digital rights management module that is embedded as part of the content. Data is collected that describes temporal traits associated with a request received from the user to access the content (block 802). The data, for instance, may be obtained from a clock that is internal to a client device 102, learned from data parsed from posts 404 of a social network service 408 using natural language processing, and so forth.

A determination is made from the data using a digital rights management module that is embedded as part of the content as to whether the temporal traits meet specified traits of a temporal behavior of a digital rights management policy enforced by the digital rights management module for the at least one item of the content (block 804). The specified traits, for instance, may limit access to business hours, lunchtime, and so forth.

Responsive to a determination that the specified traits are met, access to the least one item of the content is permitted by the embedded digital rights management module at the location (block 806). In this way, the DRM module 126 may dynamically address changes in temporal traits of a behavior associated with a user and how the user is to consume content.

Example System and Device

Figure 9:
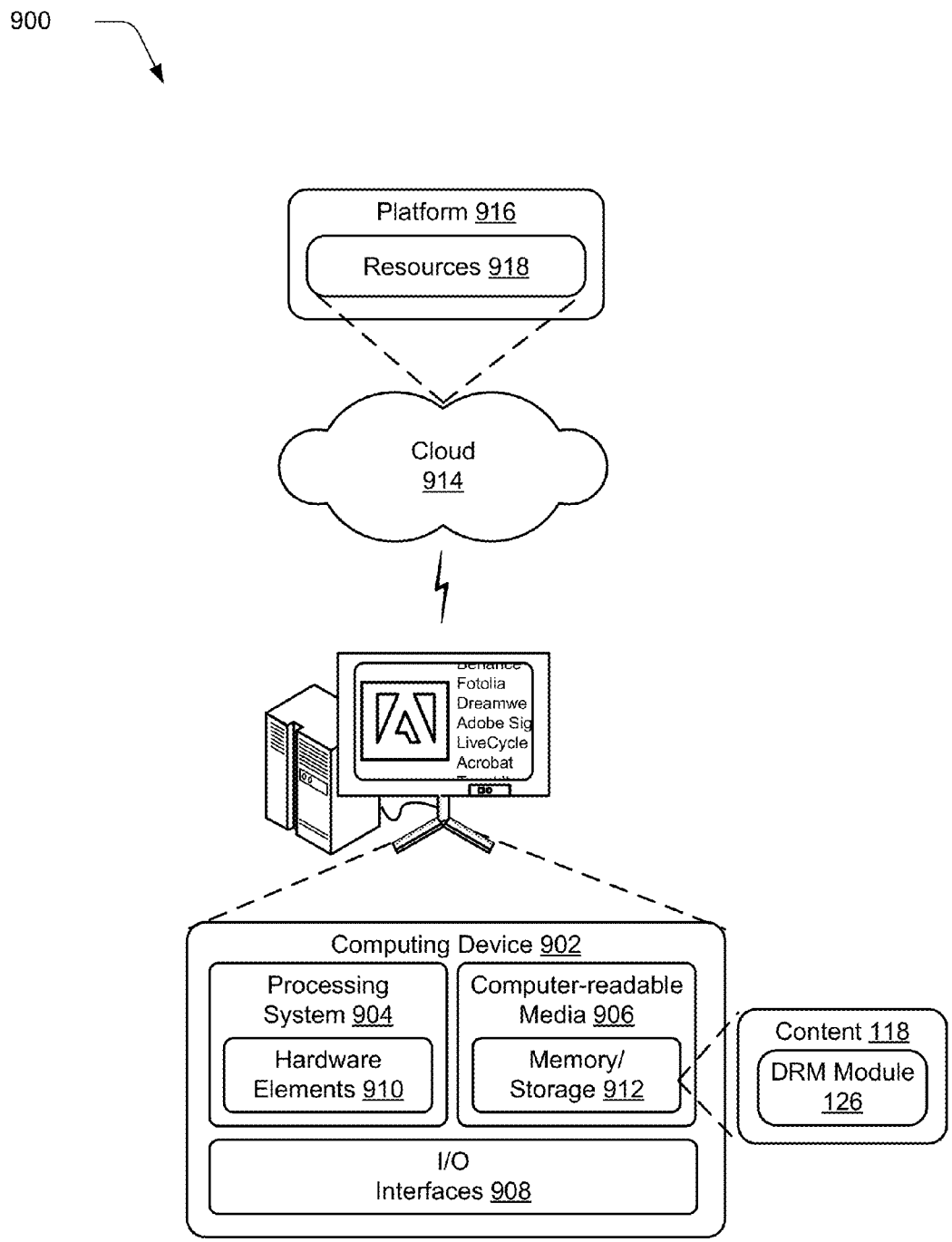
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the content 118 and DRM module 126. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control access to at least on item of content by digital rights management functionality embedded as part of the content, a method implemented by a computing device, the method comprising:
    collecting data, using position determining functionality of the computing device, describing geographical traits of a location associated with a request received from the user to access the content;
    collecting data by the computing device from at least one third party source that describes a likely location associated with the user;
    determining from the data using a digital rights management module embedded as part of the content whether the geographical traits meet specified traits of a geographical behavior of a digital rights management policy enforced by the digital rights management module for the at least one item of the content, the determining including verifying the collected data describing the geographical traits of the location using the collected data from the at least one third party source without entry of credentials of the user; and
    responsive to a determination that the specified traits are met, permitting access to the least one item of the content, by the embedded digital rights management module, at the location.

2. The method as described in claim 1, wherein the collecting of the data describing the geographical traits is performed at least in part by accessing an analytics service as the at least one third party source by the computing device over a network.

3. The method as described in claim 2, wherein the data is collected by the analytics service from one or more other service providers via the network, the data associated with the user that originated the request.

4. The method as described in claim 3, wherein the one or more other service providers include at least one social network service.

5. The method as described in claim 3, wherein the determining by the digital rights management module includes verifying data describing geographical traits that is generated using position determination functionality of the computing device using the data collected by the analytics service, the position determining functionality based at least in part on a global positioning system or triangulation through cell towers.

6. The method as described in claim 1, further comprising responsive to a determination that the specified traits are not met, restricting access to the least one item of the content and permitting access to another item of content in which the access to the other item of content is not permitted if the determination is made that the specified traits are met.

7. The method as described in claim 1, wherein the determining includes calculating a likelihood that access to the at least one item of the content will be compromised at the location associated with the user.

8. The method as described in claim 7, wherein the calculating includes comparing the location to a list of locations that have a pre-calculated likelihood of resulting in the at least one item of the content being compromised.

9. The method as described in claim 7, wherein the calculating includes parsing text that describes the location to calculate the likelihood, the data obtained by the computing device via a network.

10. The method as described in claim 1, further comprising responsive to a subsequent determination that the location associated with the user responsive to the request has changed to another location that does not meet the specified traits, blocking access to the at least one item of content through execution of the embedded digital rights management module by the at least one computing device.

11. The method as described in claim 1, wherein the at least one item of the content does not describe characteristics of the location and thus the determining and the permitting are performed by the digital rights management module regardless of whether the at least one item of content, itself, is otherwise associated with the location.

12. A computing device comprising:
a processing system;
position determining functionality to generate data describing geographical traits of the computing device; and
memory configured to maintain content having an embedded digital rights management module that is executable by the processing system to control access to respective ones of a plurality of items of the content based at least in part on a determination as to whether a request to access respective ones of a plurality of items of the content meets specified temporal and geographic traits of a behavior of a digital rights management policy enforced by the digital rights management module, the control including verifying the data describing geographical traits that is generated using position determination functionality of the computing device using data collected by an analytics service without entry of user credentials.

13. The computing device as described in claim 12, wherein data describing the geographical traits is collected through execution by the embedded digital rights management module to access the analytics service over a network.

14. The computing device as described in claim 13, wherein the data is collected by the analytics service from one or more other service providers via the network, the data describing the user that originated the request.

15. The computing device as described in claim 13, wherein the embedded digital rights management module is configured to control access to respective ones of the plurality of items of the content based on the specified temporal and geographic traits regardless of what is described by the respective ones of the plurality of items of the content.

16. In a digital medium environment to control access to at least on item of content by digital rights management functionality embedded as part of the content, a system comprising:
means for collecting data, using position determining functionality, describing geographical traits of a location associated with a request received from the user to access the content;
means for collecting data from at least one third party source that describes a likely location associated with the user;
means for determining from the data whether the geographical traits meet specified traits of a geographical behavior of a digital rights management policy enforced by the digital rights management module for the at least one item of the content, the determining including verifying the collected data describing the geographical traits of the location using the collected data from the at least one third party source without entry of credentials of the user; and
means permitting access to the least one item of the content at the location responsive to a determination that the specified traits are met.

17. The system as described in claim 16, wherein the data describing the geographical traits is collected at least in part by accessing an analytics service as the at least one third party source by the computing device over a network.

18. The system as described in claim 17, wherein the data is collected by the analytics service from one or more other service providers via the network, the data associated with the user that originated the request.

19. The system as described in claim 18, wherein the one or more other service providers include at least one social network service.

20. The system as described in claim 18, wherein the determining by the digital rights management module includes verifying data describing geographical traits that is generated using position determination functionality of the computing device using the data collected by the analytics service, the position determining functionality based at least in part on a global positioning system or triangulation through cell towers.

* * * * *